United States Patent [19]
Westberg

[11] 4,089,090
[45] May 16, 1978

[54] ARRANGEMENT FOR PERFORATING A STRIPE

[75] Inventor: Johan Eric Hayden Westberg, Lidingo, Sweden

[73] Assignee: AGA Aktiebolag, Lidingo, Sweden

[21] Appl. No.: 764,802

[22] Filed: Feb. 2, 1977

[30] Foreign Application Priority Data

Feb. 5, 1976 Sweden ................................ 7601221

[51] Int. Cl.² .................................................... B21D 31/04
[52] U.S. Cl. ........................................... 29/6.1; 72/186
[58] Field of Search .............................. 29/6.1; 72/186

[56] References Cited

U.S. PATENT DOCUMENTS

| | | | |
|---|---|---|---|
| 1,526,769 | 2/1925 | Bradford | 29/6.1 |
| 3,276,096 | 10/1966 | McAleer et al. | 29/6.1 |
| 3,760,470 | 9/1973 | Felsenthal | 29/6.1 |

Primary Examiner—Donald R. Schran
Attorney, Agent, or Firm—Larson, Taylor and Hinds

[57] ABSTRACT

An arrangement for perforation a stripe of a ductile material such as plastics or a ductile metal such as aluminum or copper and for forming a lattice of the stripe comprises a preferably rotating cutting roll, which cooperates with a holding-up tool. The cutting roll has at least one axially aligned row of cutting plates. Each cutting plate has a cutting edge and a partly cylindrical part, which forms a part of the cylindrical mantle surface of the cutting roll. In cooperation with the holding-up tool the cutting edges of the cutting plates make a row of slots in the stripe, whereupon the walls of the slots are extended in the longitudinal direction of the stripe, while the partly cylindrical parts of the cutting plates hold other parts of the stripe against the holding-up tool so as to form a lattice without changing the width of the stripe.

8 Claims, 5 Drawing Figures

ARRANGEMENT FOR PERFORATING A STRIPE

The present invention concerns an arrangement for perforating a stripe of a ductile material. Such a material may be plastics or some metal, such as copper or aluminum.

One object of the invention is to achieve a perforation of a stripe without changing the width of the stripe during the perforating operation. This is very essential if for some reason some parts of the stripe in the longitudinal direction of the same are to be unperforated whereby the perforated and unperforated parts of the stripe shall have the same width. Another object of the invention is to enable a high production capacity and to avoid waste of material.

The invention which is characterized by the features disclosed in the annexed claims will be described below with reference to the annexed drawings, where FIG. 1 shows the arrangement in a plan view and FIG. 2 shows a section along the line II—II of FIG. 1.

Figure 1:
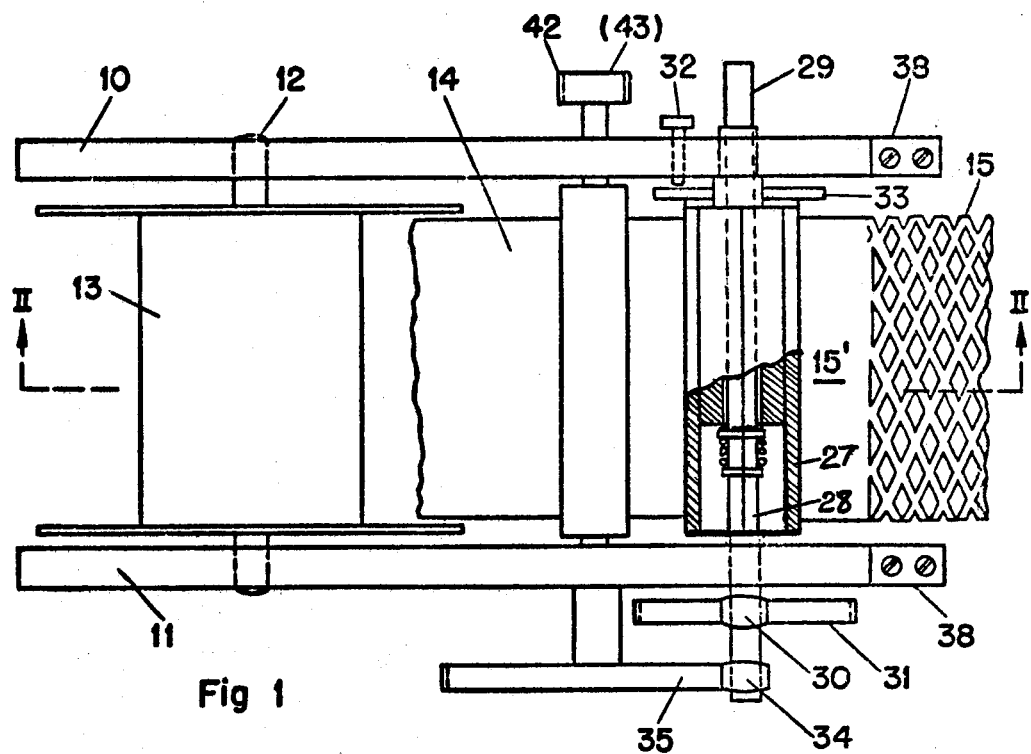

As shown in FIG. 1 the arrangement comprises two side gables 10 and 11, which can be mounted on a base plate, not shown in the drawing. Between the side gables 10 and 11 a supply roll 13 for the stripe to be perforated is freely rotatable around a shaft 12. The part of the stripe leaving the supply roll 13 is designated 14 and the part of the stripe, which has been perforated is designated 15, whereby a part 15' is left unperforated. The stripe 14 passes between two feed rollers 16 and 17, which are rotated at a constant speed in a manner described below. By means of the feed rollers 16 and 17 the stripe is conducted to a cutting and perforating arrangement, which consists of a rotating cutting roll 18, which cooperates with a holding-up tool 19. These means cut a number of slots distributed over the width of the stripe and further on these slots are elongated by these means so that the perforation shown at the reference numeral 15 is obtained.

Figures 3, 4:
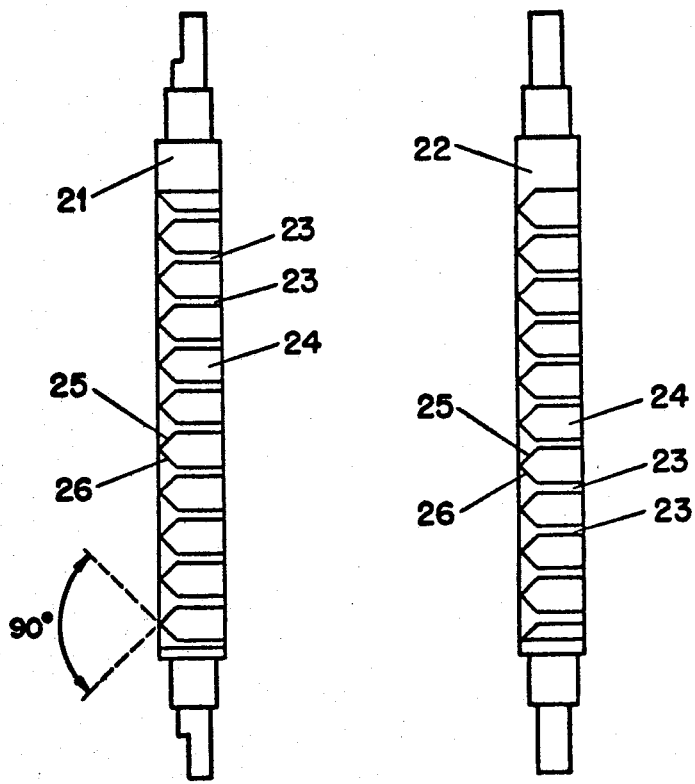
FIGS. 3 and 4 show a cutting roll of the arrangement in a plan view and in two different positions of rotation.
Figure 5:
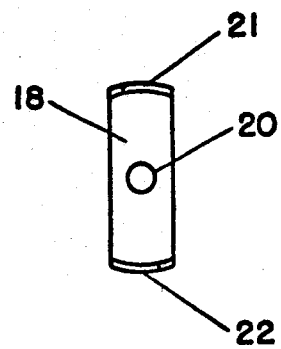
FIG. 5 shows an end view of this cutting roll.

As shown in FIGS. 3, 4 and 5 the cutting roll 18 consists of a relatively thick plate, which is rotatable around a shaft 20. The two diametrically opposed parts 21 and 22, which form parts of a cylindrical mantle surface, are divided into a number of cutting plates aligned in the axial direction of the cutting roll. In FIG. 3 those cutting plates are shown, which are arranged at the part 21, while FIG. 4, which shows the cutting roll 18, when it has been turned one half revolution from the position according to FIG. 3, shows the cutting plates at the part 22.

The individual cutting plates are separated by peripheral grooves 23 in the mantle surface. Each cutting plate has a partly cylindrical part 24, which forms a part of the previously mentioned mantle surface and two cutting edges 25 and 26, which form a predetermined angle with each other, preferably 90°. The apex of the angle points in the same direction as the direction of rotation of the cutting roll 18. In another embodiment of the invention the two cutting edges may be replaced by a single cutting edge, which may be formed as an arc. As shown in FIGS. 3 and 4 the cutting plates of the part 22 are displaced in the axial direction with reference to the cutting plates of the part 21, whereby the displacement is equal to half the distance between the angle points of two successive cutting plates.

The holding-up tool 19 is in the embodiment of the invention shown in the drawing formed as a flattened edge of a square roll 27, which is rotatable around a shaft 28, said shaft being eccentrical with reference to the square section of the roll 27. The eccentricity is so large that the distance from the shaft 28 to the flattened edge 19 is larger than the distance to the other three edges of the square roll 27.

Figure 2:
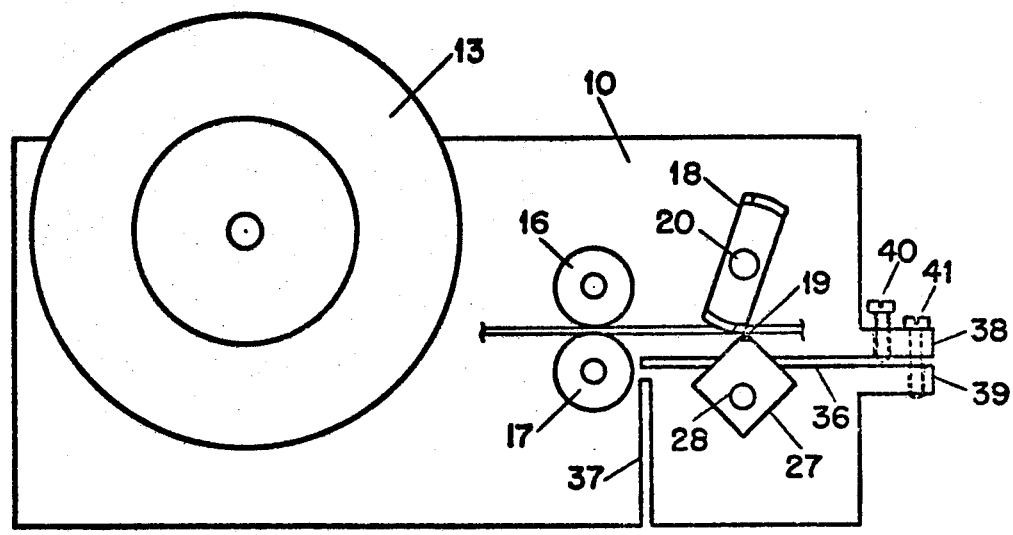

The cutting roll 18 is adapted to be rotated with a constant speed of rotation by means of an ordinary driving means, such as a motor, not shown in the drawing, which is connected with end 29 of the shaft 28. The other end of the cutting roll 18 is provided with a small gear wheel 30, which meshes with a larger gear wheel 31 mounted on the shaft 28 of the square roll 27. In a well known manner shown in FIG. 1 the shaft 28 is in driving connection with the square roll 27 over a friction clutch so that the square roll 27 can be rotated with the same speed of rotation as the shaft 28 provided that the square roll 27 is not locked. However, the arrangement is provided with locking means, in FIG. 1 shown as a pin 32, which passes through the end gable 10 and which, when being pushed in, can engage a radial slot or the like in a preferably circular disc 33, which is firmly connected with the square roll 27. Then the square roll 27 is held in such a position that the flattened edge 19 can cooperate with the cutting roll 18 as shown in FIG. 2. If, however, the pin 32 is drawn out of engagement with the radial slot, the square roll 27 follows the rotation of the shaft 28. The arrangement is preferably so designed that the square roll 27 may rotate one turn, whereupon it is again locked in the position shown in FIG. 2.

The shaft 28 which carries the square roll 27 is provided with a second gear wheel 34 shown in FIG. 1. This gear wheel meshes with a larger gear wheel 35 which is connected with the shaft of the feed roller 16. Further on, the feed roller 17 is adapted to be driven by the feed roller 16 by means of gear wheels 42 and 43 connected with these rollers. The gear ratio between the gear wheels 30 and 31 and between the gear wheels 34 and 35 is so chosen, that the feed rollers 16 and 17 feed the stripe 14 towards the cutting and perforating arrangement 18, 19 a predetermined length when the cutting roll 18 is rotated a half turn. If the slots, which are made in the stripe 14 when the cutting plate are moved towards and past the holding-up tool 19, were not further treated, this would result in rows of slots in the stripe with a mutual pitch in the longitudinal direction of the stripe equal to said length. However, each cutting plate is provided with the mantle surface 24, which forms a part of a cylinder and this gives a further treatment of each slot made by the cutting edges 25 and 26. Said part 24 on each cutting plate will keep the corresponding part of the stripe against the holding-up tool 19 at the same time as the cutting edges 25 and 26 after having made a slot in the stripe expand the walls of this slot in the longitudinal direction of the stripe. As a result thereof and since the two lines of cutting plates on the two parts 21 and 22 of the cutting roll 18 are mutually displaced in the axial direction with a distance equal to a half pitch the end result will be the perforation pattern shown on the right hand side of FIG. 1.

The pattern shown in FIG. 1 resembles the perforation pattern, which is obtained if a plurality of slots are made in a stripe as described above, whereupon the stripe is subjected to a tractive force in the longitudinal direction, so that a deformation of the slot pattern is achieved. However, such a method results in a reduction of the total width of the stripe. This is not the case with a perforated stripe which is produced with the arrangement according to the present invention. In this arrangement the extension of the narrow slot walls is made at the same time as the other parts of the stripe are held firmly against the holding-up tool 19 by the partly cylindrical mantel parts 24 mentioned before. The perforated parts 15 of the stripe will thereby be given the same total width as the unperforated parts 15', which latter parts are obtained if the locking pin 32 is withdrawn, so that the square roll 27 can be rotated and the holding-up tool 19 is moved out of engagement with the cutting roll 18.

In the lattice obtained in this way the width of the slot walls will be substantially equal to the previously mentioned feed in the longitudinal direction of the stripe caused by the feed rollers 16 and 17 during a half turn of rotation of the cutting roll 18. By variation of different parameters, such as thickness of the stripe and length of feed, perforated stripes with a more or less flat surface may be obtained.

In order to obtain a variation and adjustment of the distance between the shaft of rotation 20 of the cutting roll 18 and the holding-up tool 19 the arrangement shown in the drawing is provided with a horizontal slot 36 and a vertical slot 37, which slots are made in each one of the side gables 10 and 11 in such a way that a certain small distance remains between the upper end of the vertical slot and horizontal slot. Furtheron, each side gable is provided with an upper flange 38 and a lower flange 39. The upper flange 38 is provided with an adjustment screw 40 which causes an expansion of the slot 36 if said screw 40 is screwed into the flange 38 until it abuts the lower flange 39. A second screw 41 runs freely in a hole of the flange 38 and is screwed into the lower flange 39. If the screw 41 is tightened the slot 36 is made more narrow and this results in a decreased distance between the shafts 20 and 28.

In the embodiment of the invention described above the cutting plates are formed on a rotating cutting roll. They may however be formed on a not rotatable support which is given a reciprocating movement towards and from the holding-up tool, whereby a movement towards the holding-up tool is followed by a movement in a perpendicular direction so that the previously mentioned extension of the slot walls in the longitudinal direction of the stripe is obtained. Furtheron, it is not necessary to make the holding-up tool as a part of a rotatable roll. It is only essential that said tool can be brought out of engagement with the cutting roll during certain periods of the operating cycle so that unperforated parts of the stripe may be obtained. This can be achieved for instance by a movement of the holding-up tool away from the cutting roll.

I claim:

1. Arrangement for perforating a stripe of a ductile material, such as a plastic or a metal, comprising means for feeding in the stripe between a cutting roll and a holding-up tool, the cutting roll being provided with a plurality of cutting edges in at least one axial row, which cutting edges in cooperation with the holding-up tool make an axial row of slots in the stripe, whereupon the slot walls are expanded simultaneously with withholding other parts of the stripe for forming a lattice with slots expanded in the longitudinal direction of the stripe, said cutting roll being rotatable and provided with a plurality of cutting plates disposed in at least one axial row, each one of said plates being formed by a partly cylindrical mantel surface and two angled cutting edges, whereas the holding-up tool has an extension in the longitudinal direction of the stripe which is smaller than the extension of the cutting plates in the peripheral direction of the cutting roll.

2. Arrangement as claimed in claim 1, wherein the cutting roll (18) is provided with two diametrically opposed axial rows of cutting plates, whereas the cutting plates of one row are axially displaced in relation to the cutting plates of the other row.

3. Arrangement as claimed in claim 1, wherein the holding-up tool (19) is formed by a flattened edge of a preferably square roll (27), which is eccentrically mounted on a second shaft (28).

4. Arrangement as claimed in claim 3, wherein the shaft (28) of the square roll is parallel to the shaft (20) of the cutting roll (18).

5. Arrangement as claimed in claim 3, wherein a friction clutch is provided for driving the square roll (27) from the rotating cutting roll (18), whereas a releasable locking means (32, 33) is adapted for withholding the square roll (27) in such a position that the holding-up tool (19) is cooperating with the cutting plates.

6. Arrangement as claimed in claim 1, wherein feeding rolls (16, 17) for the stripe are mounted between a supply roll (13) for the stripe (14) and the cutting roll (18) with the holding-up tool (19), said feeding rolls being driven by the rotating cutting roll.

7. Arrangement as claimed in claim 1, wherein the distance between the shaft of rotation of the cutting roll and the holding-up tool is adjustable.

8. Arrangement for slitting and longitudinally expanding a stripe of a ductile material, such as a plastic or a metal, comprising a rotatable cutting roll, a plurality of cutting edges disposed in at least one axial row on the mantel surface of the cutting roll, a holding-up tool cooperating with the cutting edges for making rows of slits extending transversely to the longitudinal direction of the stripe passing between said cutting roll and said tool and for expanding the walls of said slits in said longitudinal direction, said cutting roll being further provided with withholding means for withholding other parts of the stripe during said expanding of said walls.

* * * * *